(12) United States Patent
Bess

(10) Patent No.: US 10,517,273 B2
(45) Date of Patent: Dec. 31, 2019

(54) ANIMAL MUZZLE

(71) Applicant: Joanna Bess, Dover, KY (US)

(72) Inventor: Joanna Bess, Dover, KY (US)

( * ) Notice: Subject to any disclaimer, the term of this patent is extended or adjusted under 35 U.S.C. 154(b) by 480 days.

(21) Appl. No.: 15/057,204

(22) Filed: Mar. 1, 2016

(65) Prior Publication Data

US 2016/0255815 A1 Sep. 8, 2016

Related U.S. Application Data

(60) Provisional application No. 62/129,794, filed on Mar. 7, 2015.

(51) Int. Cl.
*A01K 25/00* (2006.01)

(52) U.S. Cl.
CPC .................................. *A01K 25/00* (2013.01)

(58) Field of Classification Search
CPC .... A01K 25/00; A01K 27/005; A01K 27/003; A01K 13/006; A01K 15/00; A01K 15/04; A61D 2003/003
See application file for complete search history.

(56) References Cited

U.S. PATENT DOCUMENTS

| 692,326 | A | * | 2/1902 | Millis | A01K 25/00 |
| | | | | | 119/832 |
| 868,145 | A | * | 10/1907 | Swender | A01K 25/00 |
| | | | | | 119/832 |
| 1,455,445 | A | * | 5/1923 | Miner | A01K 15/006 |
| | | | | | 119/831 |
| 1,468,416 | A | * | 9/1923 | Rasmussen | A01K 25/00 |
| | | | | | 119/832 |
| 1,474,303 | A | * | 11/1923 | Veres | A01K 25/00 |
| | | | | | 119/831 |
| 1,511,339 | A | * | 10/1924 | Hord | A01K 25/00 |
| | | | | | 119/832 |
| 1,543,960 | A | * | 6/1925 | Tobin | A01K 13/006 |
| | | | | | 119/831 |
| 1,927,242 | A | * | 9/1933 | Miner | A01K 25/00 |
| | | | | | 119/832 |
| 2,614,879 | A | | 10/1952 | Citso | |
| 2,658,478 | A | * | 11/1953 | Jones | A01K 25/00 |
| | | | | | 119/822 |

(Continued)

FOREIGN PATENT DOCUMENTS

| DE | 465308 C | * | 9/1928 | ............. A01K 25/00 |
| FR | 2888719 A1 | * | 1/2007 | ............. A01K 25/00 |
| GB | 312502 A | * | 5/1929 | ............. A01K 25/00 |

*Primary Examiner* — Kathleen I Alker
(74) *Attorney, Agent, or Firm* — Daniel F. Nesbitt; Daniel H. Lajiness; Hasse & Nesbitt LLC

(57) ABSTRACT

An animal muzzle having at least one releasable application handle for placing the muzzle on an aggressive or dangerous animal while keeping the user's hands a safe distance from the animal's mouth. An application handle may be made of any semi-rigid or rigid material and can employ any one of several fastening means to fasten to the muzzle body, including a mounting post and post-receiving slot mechanism. With the application handle fastened to the muzzle, a user may position the muzzle around the animal's snout and secure the muzzle around the animal's head without fear of being bitten or injured. Then, once the muzzle is secured, the user can detach the releasable application handle, leaving the muzzle in place.

19 Claims, 9 Drawing Sheets

(56) References Cited

U.S. PATENT DOCUMENTS

| | | | | |
|---|---|---|---|---|
| 3,126,869 A * | 3/1964 | Young et al. | ............ | A01K 15/02 |
| | | | | 119/65 |
| 3,308,791 A * | 3/1967 | D'Elia | ................... | A01K 13/00 |
| | | | | 119/832 |
| 4,160,428 A | 7/1979 | Wilkinson | | |
| 4,252,086 A | 2/1981 | Schenck | | |
| 4,603,659 A | 8/1986 | Helphrey | | |
| 4,659,125 A | 4/1987 | Chuan | | |
| 4,799,458 A * | 1/1989 | Goshorn | .............. | A01K 13/006 |
| | | | | 119/815 |
| 4,838,206 A * | 6/1989 | Anderson | .............. | A01K 25/00 |
| | | | | 119/831 |
| 5,099,800 A * | 3/1992 | Fitzpatrick | ............ | A01K 25/00 |
| | | | | 119/711 |
| 5,136,984 A | 8/1992 | Askinasi | | |
| 5,218,929 A * | 6/1993 | Michunovich | ......... | A01K 25/00 |
| | | | | 119/832 |
| 5,249,570 A * | 10/1993 | Cox | ....................... | A01K 25/00 |
| | | | | 128/203.25 |
| 5,267,529 A * | 12/1993 | Zelinger | ................ | A01K 25/00 |
| | | | | 119/831 |
| 5,299,531 A | 4/1994 | Dietz | | |
| 5,553,350 A | 9/1996 | Chang | | |
| 5,762,030 A | 6/1998 | Paglericcio et al. | | |
| 5,778,826 A * | 7/1998 | Dillon | .................... | A01K 29/00 |
| | | | | 119/717 |
| 5,785,008 A | 7/1998 | Liu | | |
| 6,209,979 B1 | 4/2001 | Fall et al. | | |
| 7,444,960 B1 * | 11/2008 | Williams | ............... | A01K 25/00 |
| | | | | 119/761 |
| 7,445,231 B1 | 11/2008 | Tsai | | |
| 7,523,720 B1 | 4/2009 | Lecy et al. | | |
| 7,604,307 B2 | 10/2009 | Greenwald et al. | | |
| 7,891,321 B2 | 2/2011 | Slank | | |
| 8,176,878 B1 | 5/2012 | Wexler | | |
| 8,220,419 B2 * | 7/2012 | Mitton | ................... | A01K 25/00 |
| | | | | 119/832 |
| 8,596,224 B2 | 12/2013 | Taylor | | |
| 9,021,992 B1 * | 5/2015 | Cogley | .................... | A61D 5/00 |
| | | | | 119/831 |
| 9,155,602 B1 * | 10/2015 | Cogley | ................... | A01K 25/00 |
| 2002/0073936 A1 * | 6/2002 | Fields-Babineau | .... | A01K 25/00 |
| | | | | 119/863 |
| 2003/0038007 A1 | 2/2003 | Han | | |
| 2008/0264350 A1 * | 10/2008 | Frevola | ................. | A01K 25/00 |
| | | | | 119/831 |

* cited by examiner

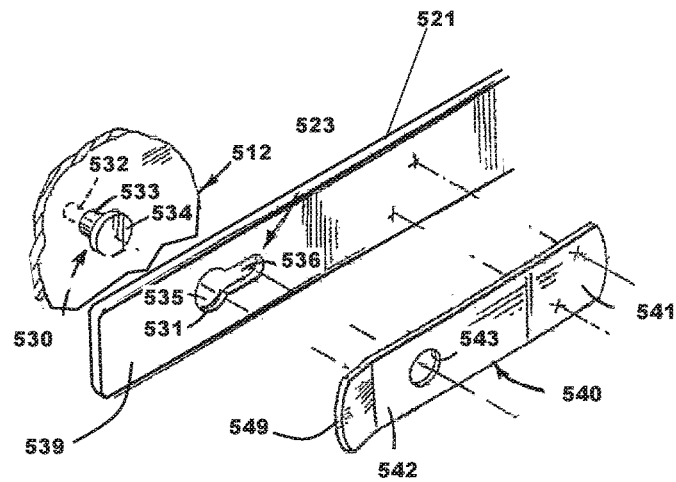
Fig. 10
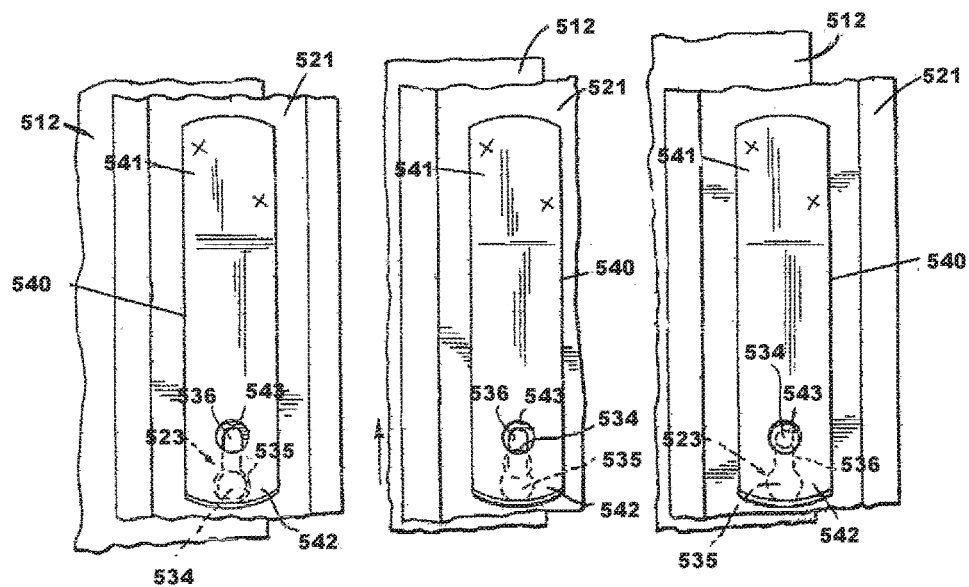
Fig. 11a  Fig. 11b  Fig. 11c

ANIMAL MUZZLE

CROSS REFERENCE TO RELATED APPLICATIONS

This patent application claims priority from U.S. Provisional Application Ser. No. 62/129,794, filed Mar. 7, 2015, entitled "Animal Muzzle", incorporated herein in its entirety by reference.

TECHNICAL FIELD

The present invention relates to a new and useful improvement to a muzzle for domestic or wild animals, more particularly for dogs or cats, to be used in order to enable a person, without fear of injury, to easily and safely apply a muzzle to a fractious or aggressive animal.

BACKGROUND OF THE INVENTION

Frequently, many different animals, especially dogs and cats, require capture, handling, training, grooming, medical treatment, or other care. Most commonly, such animals require veterinary check-ups, immunizations, and/or treatment for various diseases or injury. In these situations, animals often become nervous, agitated, fractious, or aggressive, making them difficult to control, and in some cases, dangerous. The animals may lash out and bite, causing severe injuries to a person or persons such as owners, handlers, groomers, trainers, police officers, wardens, zookeepers, and/or veterinary personnel. In order to protect themselves from such injuries, people can apply muzzles to these fractious and aggressive animals. Such muzzles are known in the prior art.

The muzzles of the prior art typically comprise a mouth-encircling portion that covers the animal's snout, allowing only a limited amount of movement of the animal's jaws, and at least one strap extending longitudinally from one end of the mouth-encircling portion that encircles the animal's head to secure the muzzle in place on the animal. Examples of such muzzles include those described in U.S. Pat. No. 1,474,303 (Veres), U.S. Pat. No. 4,160,428 (Wilkinson), U.S. Pat. No. 4,252,086 (Schenck), U.S. Pat. No. 4,603,659 (Helphrey), U.S. Pat. No. 5,136,984 (Askinasi), U.S. Pat. No. 5,218,929 (Michunovich), U.S. Pat. No. 5,267,529 (Zelinger), U.S. Pat. No. 5,299,531 (Dietz), U.S. Pat. No. 5,762,030 (Paglericcio, et al.), U.S. Pat. No. 5,785,008 (Liu), U.S. Pat. No. 7,891,321 (Slank), and U.S. Pat. No. 8,596,224 (Taylor), the disclosures of which are incorporated by reference in their entireties.

While the muzzles described in these patents are usually effective in preventing a nervous, agitated, fractious, or aggressive animal from having the freedom to open its mouth wide enough to bite or otherwise injure people, the act of applying the muzzle to such an animal is potentially hazardous for the user. In order to place a muzzle according to the prior art on an animal, a person must grasp the mouth-encircling portion or the strap or straps extending from the mouth-encircling portion and pull the mouth-encircling portion over the animal's snout before securing the muzzle to the animal's head by fastening the strap or straps behind the animal's head. The strap or straps extending from the mouth-encircling portion are necessarily short and flexible, and the person placing the muzzle must bring their hands very close to the animal's mouth in order to properly secure the muzzle in place. This is typically an easy and safe task if the animal is calm, sedated, and/or is familiar with wearing such a device. However, if the animal is nervous, agitated, fractious, or aggressive, applying a muzzle exposes the person to injury if he or she is bitten by the animal. Furthermore, even after the person has applied the muzzle to the snout of the animal, he or she is still in danger if the animal lurches or twists out of the mouth-encircling portion applied to its snout before the strap or straps are securely fastened behind the animal's head.

Capture sticks comprising rigid poles with a loop of rope or wire have been used to capture a fractious or aggressive animal by ensnaring the animal's head. However, these types of devices are often ineffective because they do not secure the animal's mouth; they can choke and frighten the animal causing them to struggle, lurch about, and try to escape the device possibly biting the person or persons trying to handle the animal; or they can even cause injury to the animal itself. Consequently, many pet owners object to the use of these types of devices. U.S. Pat. No. 8,176,878 (Wexler), uses a capture stick with a opaque hood to cover the animal's head in an attempt to secure and calm the animal, but this method does not secure the its mouth and makes it difficult to examine the animal's eyes, ears, snout, and head. This method is also obstructive for applying a muzzle because the hood must be removed or loosened to position the muzzle and secure it to the animal's head, exposing the person or persons attempting to apply the muzzle to bites or serious injuries.

None of the muzzles described in the prior art address the prevention of injury to a person or persons while placing a muzzle on a nervous, agitated, fractious, or aggressive animal. It is therefore an object of the present invention to provide an improved muzzle which is simple and safe to apply to a said animal in need of capture, handling, training, grooming, medical treatment, or other care.

SUMMARY OF THE INVENTION

The present invention relates to a new and improved muzzle for wild and domestic animals, especially dogs and cats, having a means to safely apply and secure the muzzle to nervous, agitated, fractious, or aggressive animals in need of capture, training, grooming, medical treatment, or other handling, without injury to the person or persons applying the muzzle. In an embodiment of the invention, the muzzle comprises application handles releaseably fastened to the muzzle body to allow the a person handling the muzzle to keep their hands at a safe distance from the animal's mouth while positioning the muzzle on the animal's head and securing it in place.

The present invention provides a muzzle comprising: a muzzle body to be placed on the head of an animal to cover the snout of an animal, having a front end adapted to receive the snout of an animal, a rear end adapted to receive the mouth of the animal, and including a strap assembly for securing the muzzle to the animal's head; and at least on releasable application handle fastenable to the muzzle body and extending away from the muzzle, configured for placing of the muzzle onto the head of the animal while keeping the user's hands at a safe distance from the animal's mouth. At least one application handle fastens to the muzzle body by a fastener means comprised of a first fastener element fixed onto one end of the application handle and a second fastener element fixed onto the lateral side of the muzzle body. The fastener means can be selected from the group consisting of a hook material and a loop material, a button and a button hole, a button and string, a snap stud and snap socket, a buckle and strap, and a mounting post and post-receiving slot mechanism.

In another aspect of the invention, the application handles can be fixed integrally to the opposed lateral sides of a muzzle body, rather than being releaseably fastenable.

In a further aspect of the invention, the application handle can be a fully adjustable-length telescoping application handle that includes a plurality of telescoping tube sections that can be extended section by section in sequence, to a length to be determined by the user.

These and other objects and features of the present invention will become apparent to one skilled in the art from the following description and accompanying drawings. It is to be understood that the drawings are designed for illustration purposes only and are not intended to define the limit or scope of the present invention.

BRIEF DESCRIPTION OF THE DRAWINGS

FIGS. 10, and 11a through 11c, show an detailed view of an alternative fastening means having a post retainer means for fastening the application handle to the muzzle body.

DETAILED DESCRIPTION OF THE INVENTION

The muzzles described in the prior art and herein may be used to secure various different animals. The following description uses the term animal and dog interchangeably but, while the dog is the preferred animal, it is not intended by this description to limit the scope of the present invention to dog muzzles only.

Figure 1:
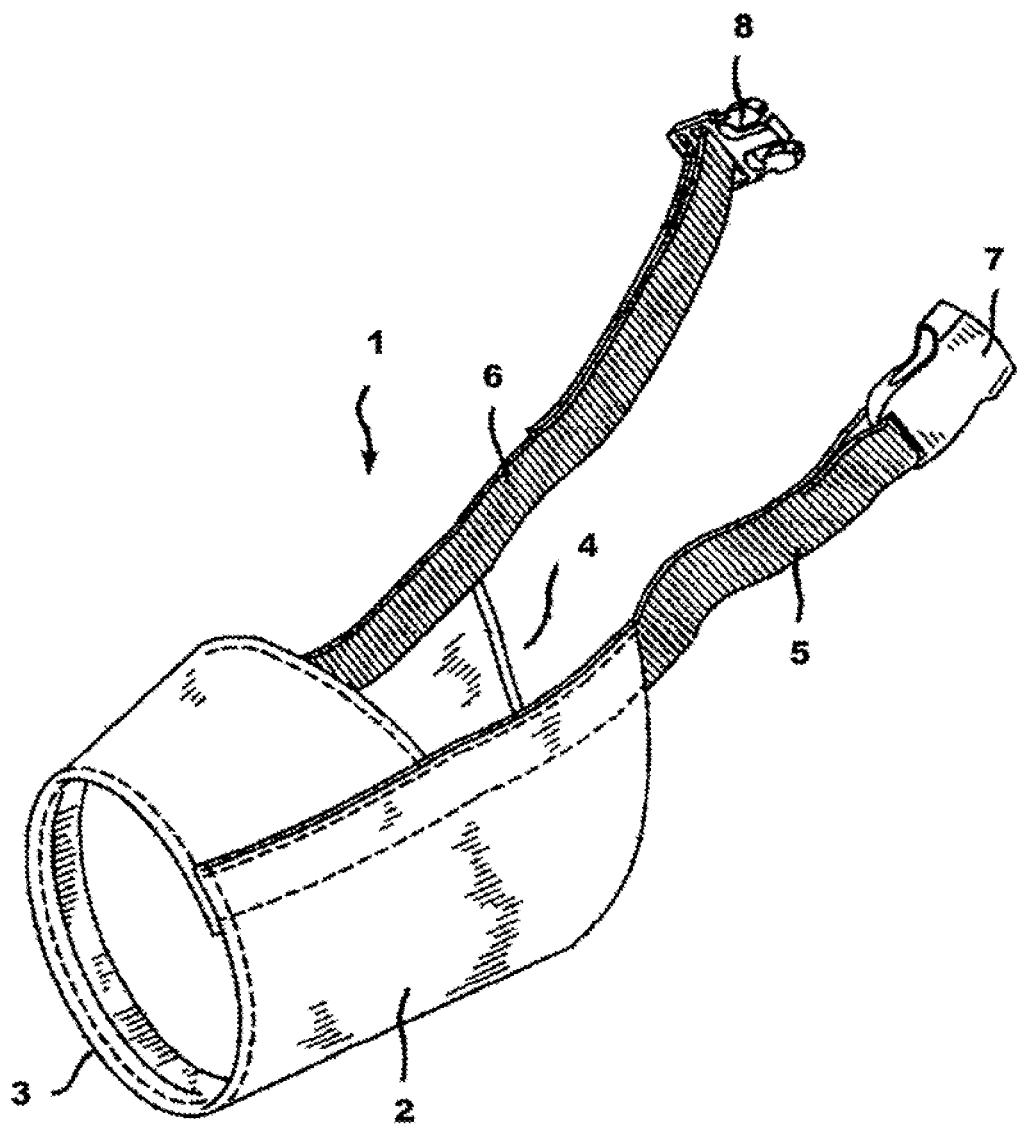
FIG. 1 shows an animal muzzle according to the prior art.
Figure 2:
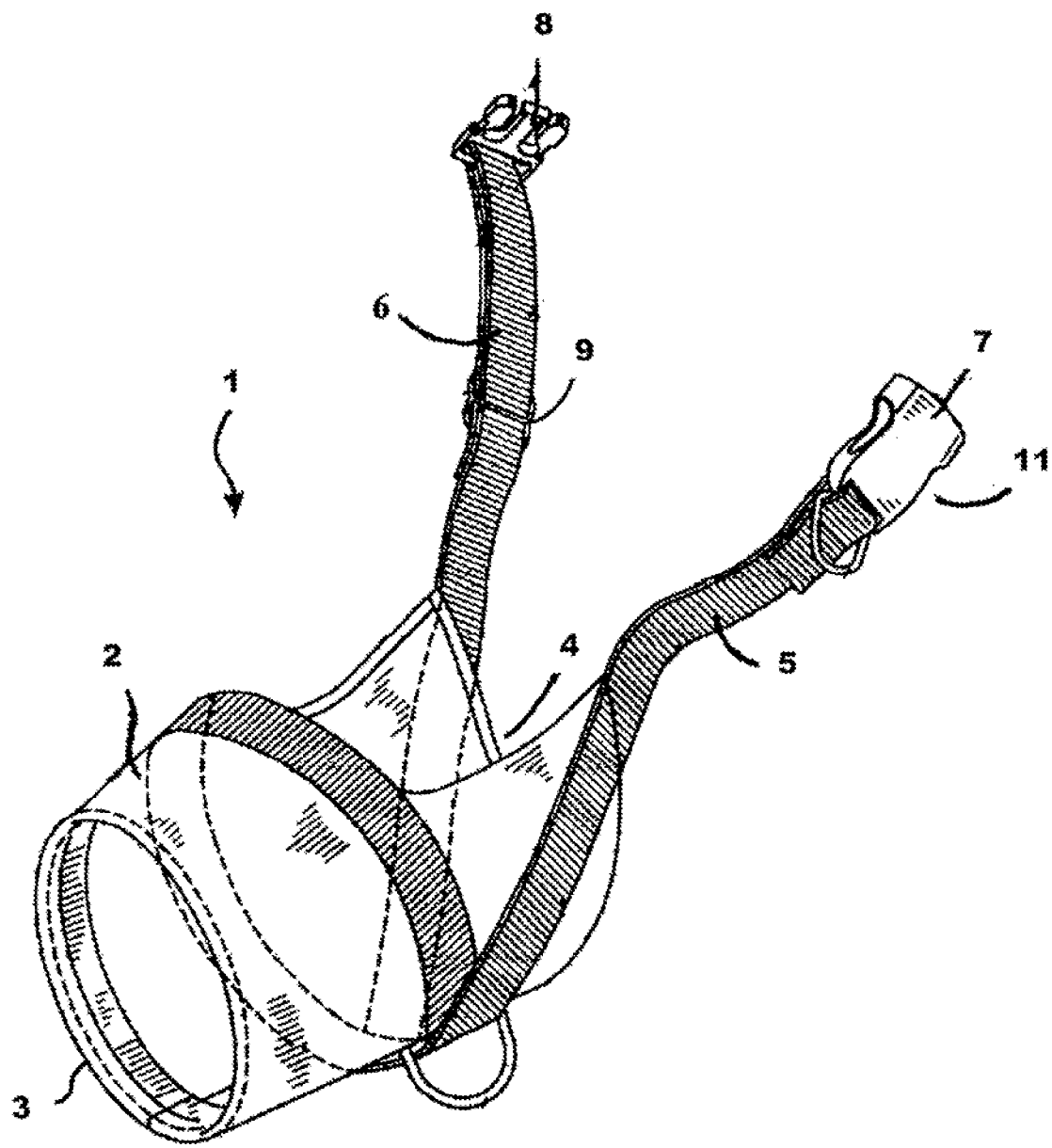
FIG. 2 shows another animal muzzle according to the prior art.

FIGS. 1 and 2 show a dog muzzle according to the prior art. The muzzle 1 comprises a somewhat cylindrical-shaped muzzle body 2 made from a flexible or semi-flexible material such as cloth, leather, wire, webbing, or other fabric, and is adapted to fit over a dog's snout to prevent the dog from opening its mouth and biting the person or persons handling the dog. The muzzle body 2 comprises a front opening 3 at one end of muzzle body 2 and a rear opening 4 at the opposite end of muzzle body 2. Front opening 3 is typically smaller in diameter than rear opening 4 and is intended to fit around the dog's snout. Rear opening 4 is typically larger in diameter than front opening 3 and is intended to fit around the dog's jaw. Two head straps 5 and 6 are fixedly attached at two opposite lateral sides of muzzle body 2 and extend longitudinally from rear opening 4. Head straps 5 and 6 comprise respective free ends terminating in a fastening means comprising a female 7 and male 8 component, such as a buckle, snap, or hook and loop (such as Velcro®) mechanism. Head straps 5 and 6 are intended to fit around and fasten behind the dog's head using fastening means 11 to secure the muzzle to the dog. Head straps 5 and 6 may have an adjustment means 9 to adjust head straps 5 and 6 to fit around the head of differently-sized dogs. Head straps 5 and 6 can be of any length but must be of sufficient length to be able to securely fasten the muzzle to the dog's head.

Muzzles of the prior art work well to prevent an animal from biting the person or persons handling the animal once the muzzle is securely fastened to the animal, but they lack a means to safely apply the muzzle to the animal without the person or persons applying the muzzle being bitten by a nervous, agitated, fractious, or aggressive animal. Typically, the person applying the muzzle to the animal must grasp muzzle body 2 or head straps 5 and 6 and pull the muzzle over the animal's snout by moving rear opening 4 of muzzle body 2 over the dog's shout toward its jaw. Head straps 5 and 6 are necessarily short to fit around the animal's head and do not allow the person or persons applying the muzzle to keep their hands far enough from the animal's mouth when pulling the muzzle over the animal's snout to prevent being bitten should the animal lash out with its mouth toward the person's hands. While the person applying the muzzle may wear gloves to reduce the possibility of injury when applying and securing the muzzle, gloves are heavy, cumbersome, and limit the person's movement and ability to correctly place the head straps 5 and 6 around the animal's head and properly secure the fastening means behind its head.

Figure 3:
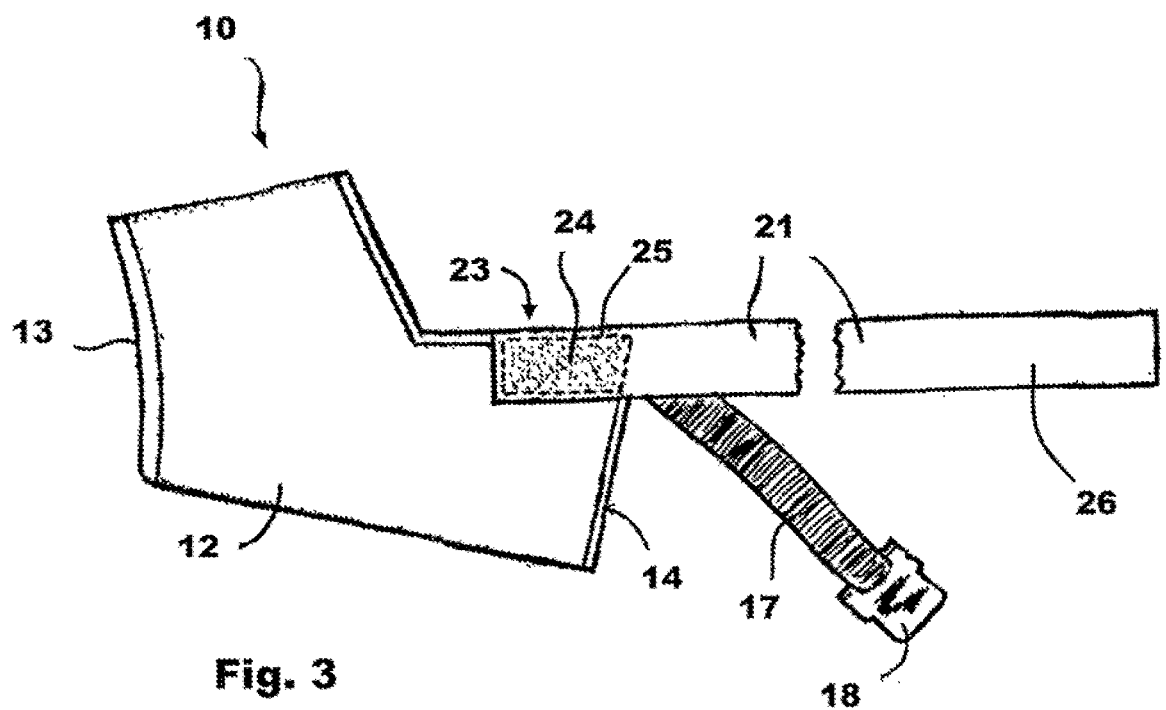
FIG. 3 shows an animal muzzle according to the present invention, wherein an application handle is fastened to the muzzle body and extends rearwardly from a rear part of the muzzle.
Figure 4:
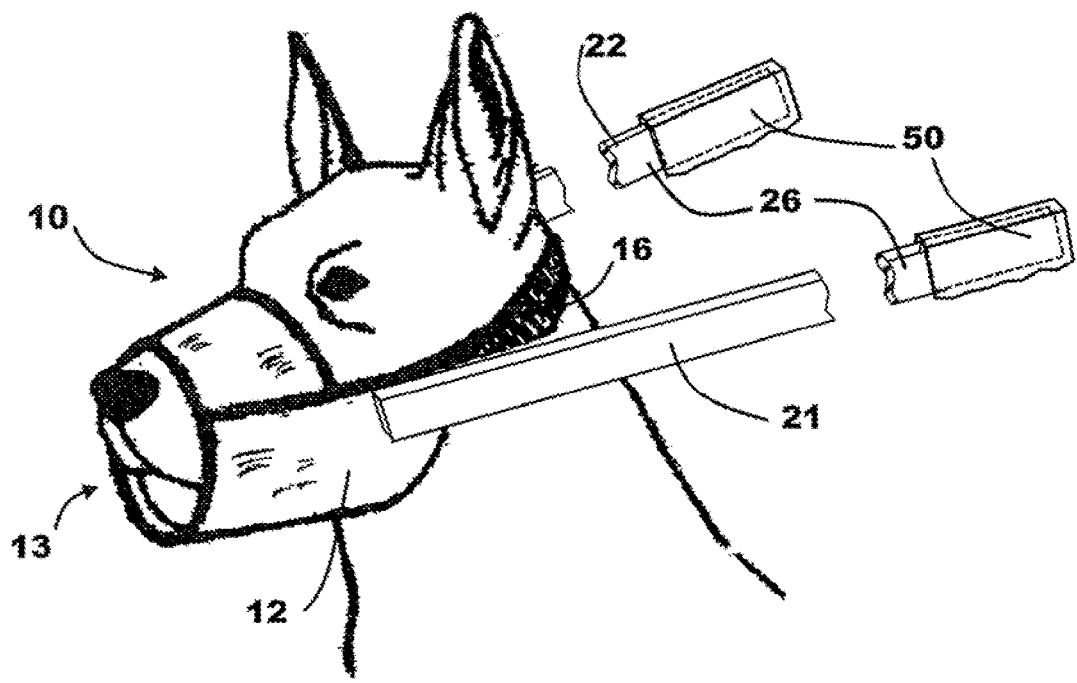
FIG. 4 shows the animal muzzle of FIG. 3 after the muzzle is secured to the dog's head using the application handles.

FIGS. 3 and 4 show a muzzle 10 of the present invention comprising a somewhat cylindrical-shaped muzzle body 12 made from a flexible, semi-flexible, or non-flexible material. The material can include a fabric made from natural, nylon or other synthetic fibers, cloth, leather, or metal wire, formed in a solid sheet, mesh, or webbing, adapted to it over a dog's snout to prevent the dog from opening its mouth and biting the person or persons handling the dog. The muzzle body 12 is typically of different sizes—for example, extra-small, small, medium, large, or extra-large—depending on the size of the dog it is intended to fit, and comprises a front opening 13 at one end of muzzle body 12 and a rear opening 14 at the opposite end of the muzzle body 12. Front opening 13 is adapted to fit around the dog's snout and is typically smaller in diameter than rear opening 14. Front opening 13 may be open or covered with a fabric such as cloth, nylon or other synthetic fibers, leather, or metal wire, formed in a solid sheet, mesh, or webbing. Rear opening 14 is open and adapted to fit around the dog's jaw and is typically larger in diameter or size than front opening 13. Two head straps (as illustrated by 5 and 6 in FIG. 1) are fixedly attached at one end to opposite lateral sides of muzzle body 12 and extend outward longitudinally from rear opening 14. Head straps 5 and 6 have respective free ends opposite rear opening 14 that include a fastening means 11, such as a buckle, snap, hook and loop (Velcro®), or other appropriate fastening mechanism. Head straps 5 and 6 may further comprise further adjustment means 9 (as shown in FIG. 2) to facilitate a proper fit around the head of differently-sized animals. FIGS. 3 and 4 illustrate a head strap 17 with a buckling fastening mechanism 18. Once fastened, head straps such as those illustrated in 5 and 6 in FIG. 2, or 17 in FIG. 3, form strap assembly 16. Head straps 17 comprising strap assembly 16 must be of sufficient length to securely affix the muzzle to the dog's head, typically eight (8) inches to ten (10) inches, six (6) inches to eight (8) inches, four (4) inches to six (6) inches, or two (2) inches to four (4) inches, depending on the size of the muzzle and/or dog the muzzle is intended to fit.

The illustrated embodiments show application handles 21 and 22 that are releasably fastened at opposite lateral sides of muzzle body 12. Application handles 21 and 22 are attached at the one end to the muzzle body 12 by a releasable fastening means 23 using a hook material 24 and a loop material 25, such as Velcro®, where hook material 23 and loop material 24 may be positioned on either of the muzzle body or the application handle. Other non-limiting examples of the releasable fastening means include a snap stud and snap pocket, buckle and strap, buttons and button hole, button and string, or a ball and detent system. The application handles 21 and 22 extend rearward longitudinally from rear opening 14, in approximately the same direction as head straps 15 and 16, and terminate in respective distal ends 26. In an alternative embodiment as shown in FIG. 4, application handles 21 and 22 may be fixedly attached to opposite lateral sides of muzzle body 12. In another alternative aspect of the invention, illustrated in FIG. 4, the application handle 21, or handles 21 and 22, can have a grip element 50 fixed or attached over the distal end 26 to improve the gripping and control over of the application handle.

To apply a muzzle using the fastened application handles of the present invention, a person (or persons) grasps the respective free ends 26 of application handles 21 and 22 fastened to muzzle body 12 and moves the free ends 26 laterally to spread apart, widen or expand the rear opening 14 of the muzzle body 12 without unfastening application handles 21 and 22 from muzzle body 12. The person then guides and moves rear opening 14 of muzzle body 12 over the snout of the animal until the animal's snout is positioned in front opening 13 of muzzle body 12 and rear opening 14 is positioned around the animal's jaw. Once muzzle 10 is in place on the animal's snout, the user secures strap assembly 16 around the back of the animal's head by securing head straps 17 using fastening mechanism 18. After securing strap assembly 16 behind the animal's head, the person or persons applying muzzle 10 can detach application handles 21 and 22 from muzzle body 12 by separating releasable fastening means 23 on application handles 21 and 22 from muzzle body 12, leaving muzzle 10 securely in place on the animal. In other embodiments of the method, the application handles can be left fastened to the muzzle body for some time as is necessary or appropriate.

In an further aspect of the invention, the distal ends 26 of the pair of application handles 21 and 22 can be releasably attachable to each other to provide one-handed control of the application handles once the application handles have been fastened to the muzzle body.

Figure 5:
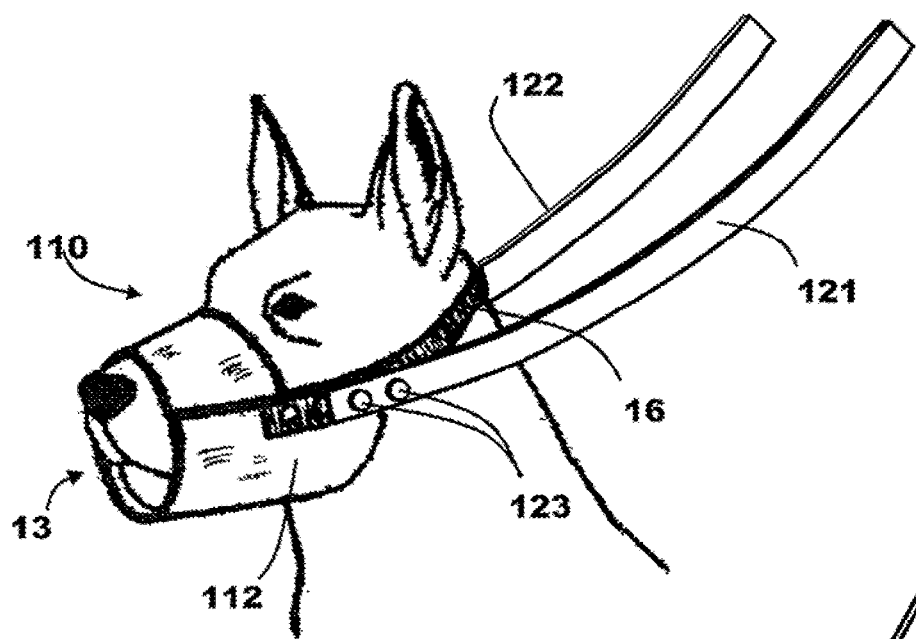
FIG. 5 shows another animal muzzle of the present invention having an application handle releasably fastened using straps, and secured to a dog's head using the application handles.
Figure 6:
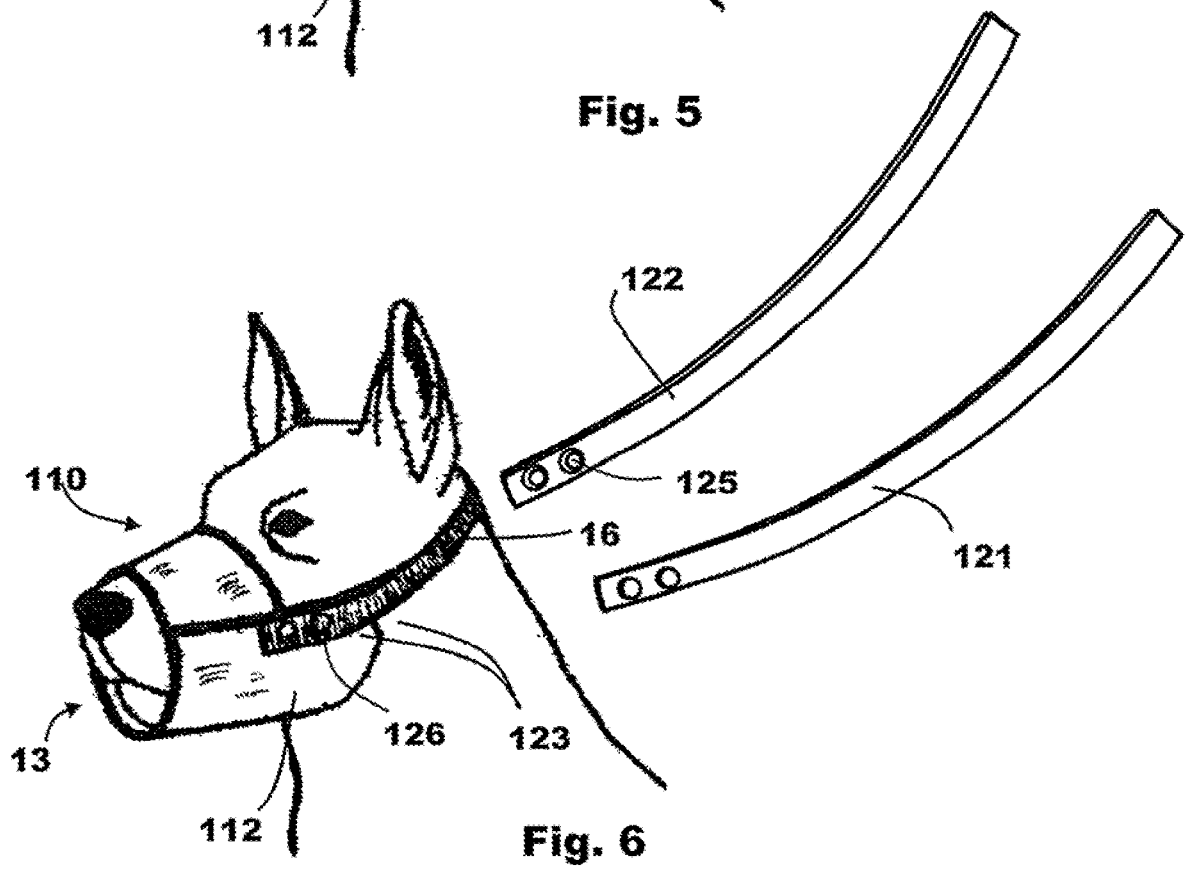
FIG. 6 shows the animal muzzle applied to the doe as shown in FIG. 5, after the application handles have been unfastened and removed from the muzzle.

FIG. 5 shows an alternative embodiment of a fastening means 123 illustrated as a pair of adjacent snap stud and snap pockets securing the handles 121 and 122 to muzzle body 112 on muzzle 110. The pairs of snap studs 125 are fixed to the proximal end of application handles 121 and 122, and a mating pair of snap pockets 126 are fixed to the opposite lateral sides of muzzle body 112. The pair of adjacent fasteners aids in keeping application handles 121 and 122 extended even when the person holds the grip-end of the handles gently or releases them completely. Once the muzzle is secured, the person can release the snap studs 125 from the snap pockets 126, as shown in FIG. 6.

In the illustrated embodiment, the body portion of the application handles have a substantially flat shape, with a cross-sectional shape that is a thin rectangle. In an alternative embodiment, the body portion of the application handle can have an I-beam- or C-beam-shaped cross section, or other construction shape, which improves the rigidity of the application handle in the lateral plane, transverse to the width of the body portion. In another aspect of the invention, the cross sectional shape of the body portion of the application handle can have a circular, oval, square of other polygonal shape in cross section.

in the illustrated embodiment, the body portion of the application handles is illustrated with a linear body portion. In an alternative embodiment, the body portion of the application handles can be curved (see for example FIGS. 5 and 6).

The structure of the application handle is typically sufficiently rigid and/or resilient to aid in guiding and extending the muzzle body away from the person's hands, for placing the extended muzzle body over the snout of the animal. The application handle is typically made of a material or materials, and of a construction, which provide the handles with a rigid or semi-rigid structure. A rigid structure may have a fixed shape that can bend slightly but noticeably with the application of a force of several pounds at the ends of the handle. A semi-rigid structure is one that has a fixed, resilient shape, but that can bend or be bent in one or more axes with a slight force or even by waving the handle in the air. A handle having a very flexible and non-resilient structure, such as a rope or a conventional leash, can be used, but are not effective for extending the muzzle body away from the body and hands of the person.

Non-limiting examples of materials can include heavy-weave web material, a resinous or thermoplastic (for example, polycarbonate, including Lexan™), wood, leather, metal or a composite or laminate thereof. The application handle should be of sufficient length to allow the person applying the muzzle to keep their hands far enough from the animal's mouth to not be bitten. The application handles will preferably be shorter or longer depending on the overall size of the muzzle and/or dog to which the muzzle is being applied and may be selected from a length of from about eight (8) inches to about twenty-eight (28) inches in length.

Figure 7A:
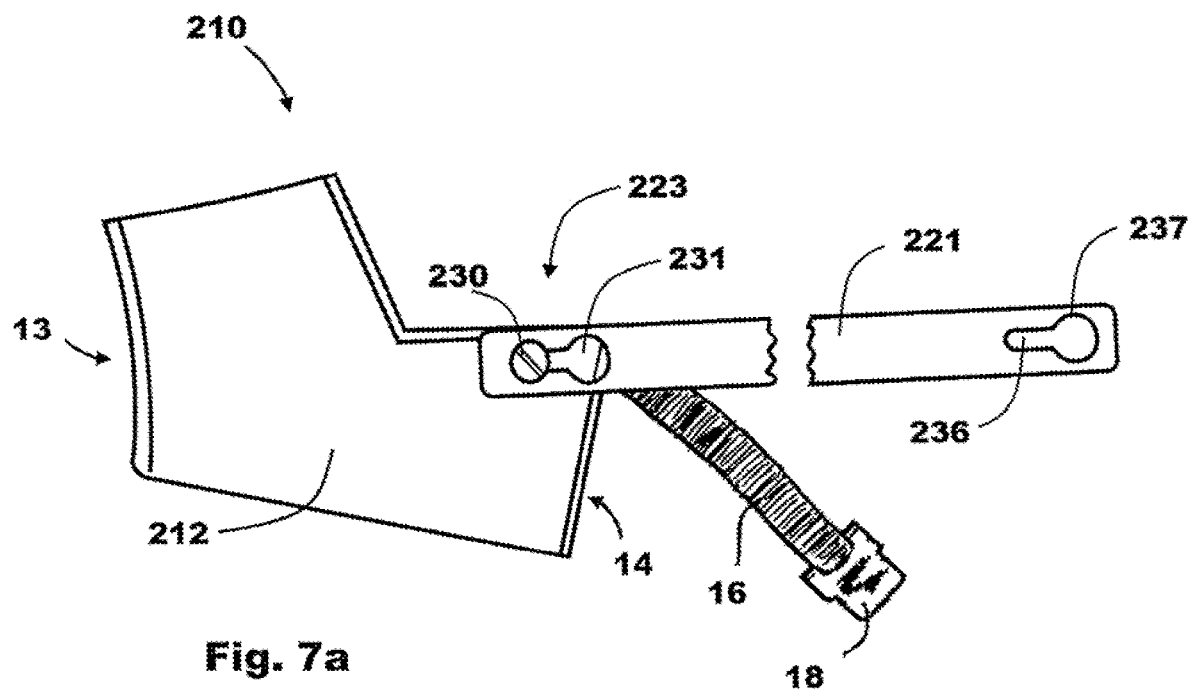
FIG. 7a shows an alternative embodiment of an animal muzzle with the application handles releasably fastened to the muzzle using a post and slotted keyhole means, with the application handles extending from the rear of the muzzle.
Figure 7B:
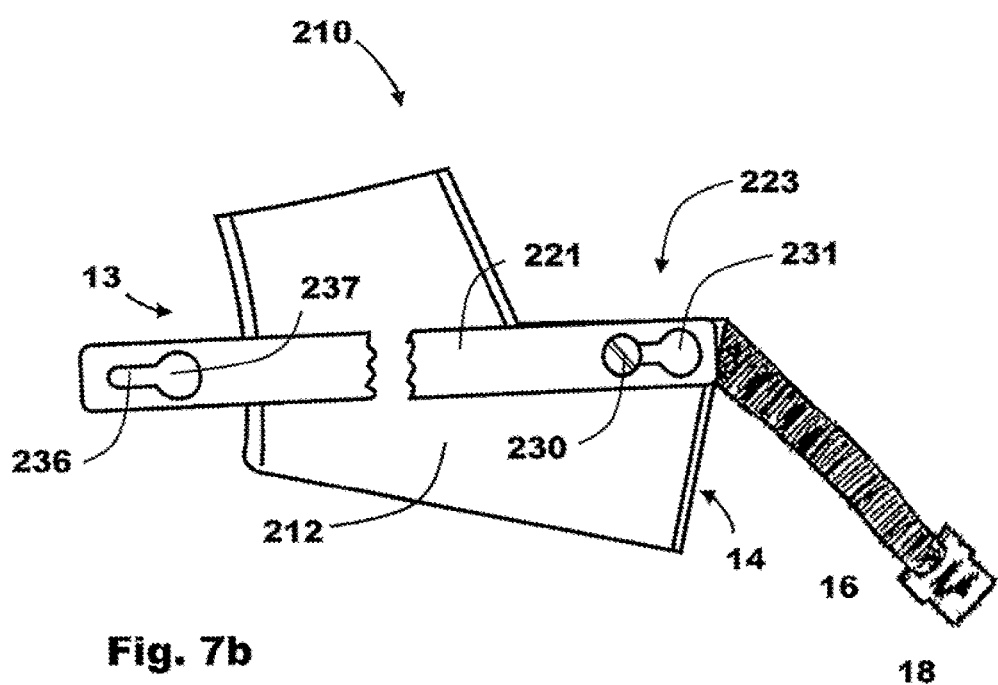
FIG. 7b shows the embodiment of the animal muzzle of FIG. 7a with the application handles extending from the front of the muzzle.

Releasable fastening means 223 can comprise a mounting post 230 and post-receiving slot 231. FIG. 7a shows an embodiment with mounting post 230 fixedly attached at one end via an anchor 532 (see FIG. 10) to a lateral side of muzzle body 212 of muzzle 210, and a post-receiving slot 231 at one end of an application handle 221 and adapted to receive mounting post 230. Each mounting post 230 includes an anchor 532 for fixed attachment to muzzle body 212 at one end, a throat 533 that secures anchor 532 to a post head 534 opposite anchor 532, that has a diameter or size larger than throat 533 (see FIG. 10). Each post-receiving slot 231 is formed to have an enlarged-diameter entry/exit portion 237 having a diameter or size large enough for the post head 534 to pass through freely, and a narrow-width post-retainer slot portion 236 having a width sufficient wide to allow reciprocal, sliding movement of throat 533 therein, but sufficiently narrow to block movement or withdrawal of post head 534 therethrough. To fasten application handle 221 to muzzle body 212, application handle 221 is moved so that post head 534 of mounting post 230 extends into the entry/exit portion 237 of keyhole-shaped post-receiving slot 231. Application handle 221 is then moved so that throat 533 of mounting post 230 slides into narrow-width post-retainer slot portion 236, thereby releasably fastening application handle 221 to muzzle body 212. Application handle 221 may be removed from muzzle body 212 by sliding throat 533 of mounting post 230 out of narrow-width post-retainer slot portion 236 and into the entry/exit portion 237 of post-receiving slot 231. Reference is made to U.S. Pat. No. 6,209,979, which is incorporated by reference in its entirety for description of the mounting post and post-receiving slot mechanisms. FIG. 7a shows application handle 221 extending rearwardly, with the fastening means arranged to maintain secure fastening when the application handle is pulled rearwardly from the animal's head. Conversely, FIG. 7b shows application handle 221 extending forwardly, with the fastening means 223 arranged to maintain secure fastening when the application handle is pushed rearwardly toward the animal's snout.

Figure 8:
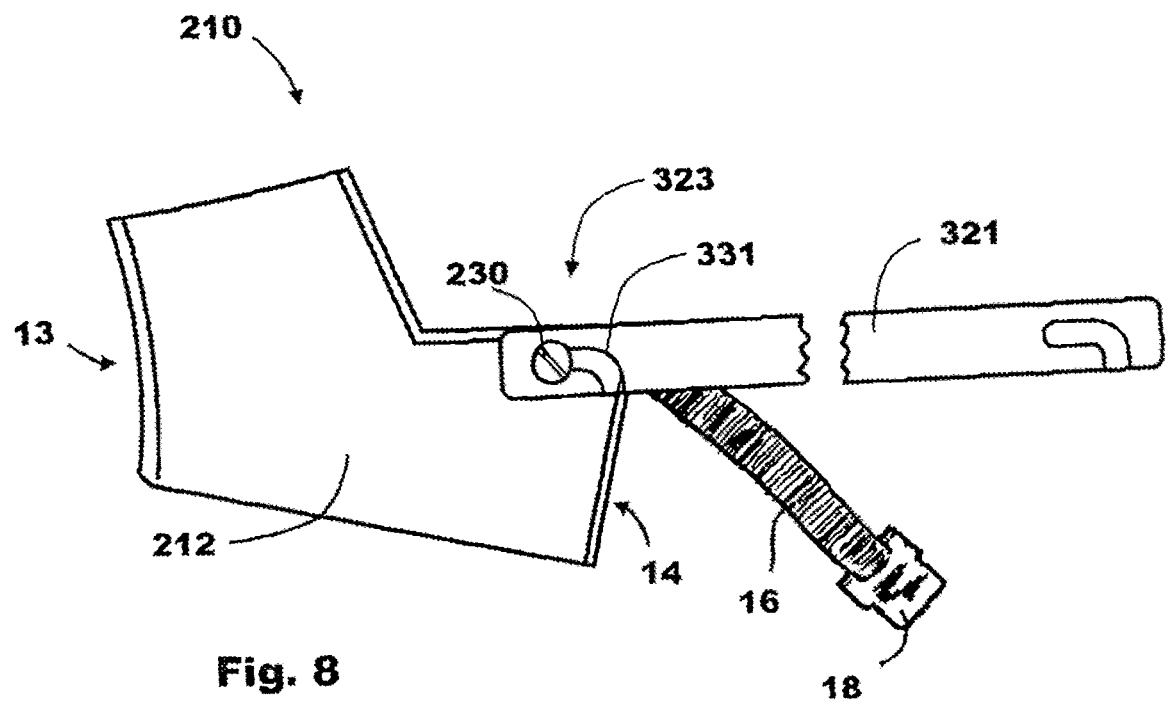
FIG. 8 shows an another embodiment of an animal muzzle with an alternative post and J-shape slotted keyhole fastening means, with the application handles extend from the rear of the muzzle.

FIG. 8 shows an alternative fastening means 323 wherein the post-receiving slot 331 for receiving mounting post 230 has a "J" shape, with a leg portion of the J-shaped slot extending along the axis of the application handle 321, and the hooking end of the slot extending inward from the side edge of the body portion of application handle 321 and intersecting the leg portion.

Figure 9:
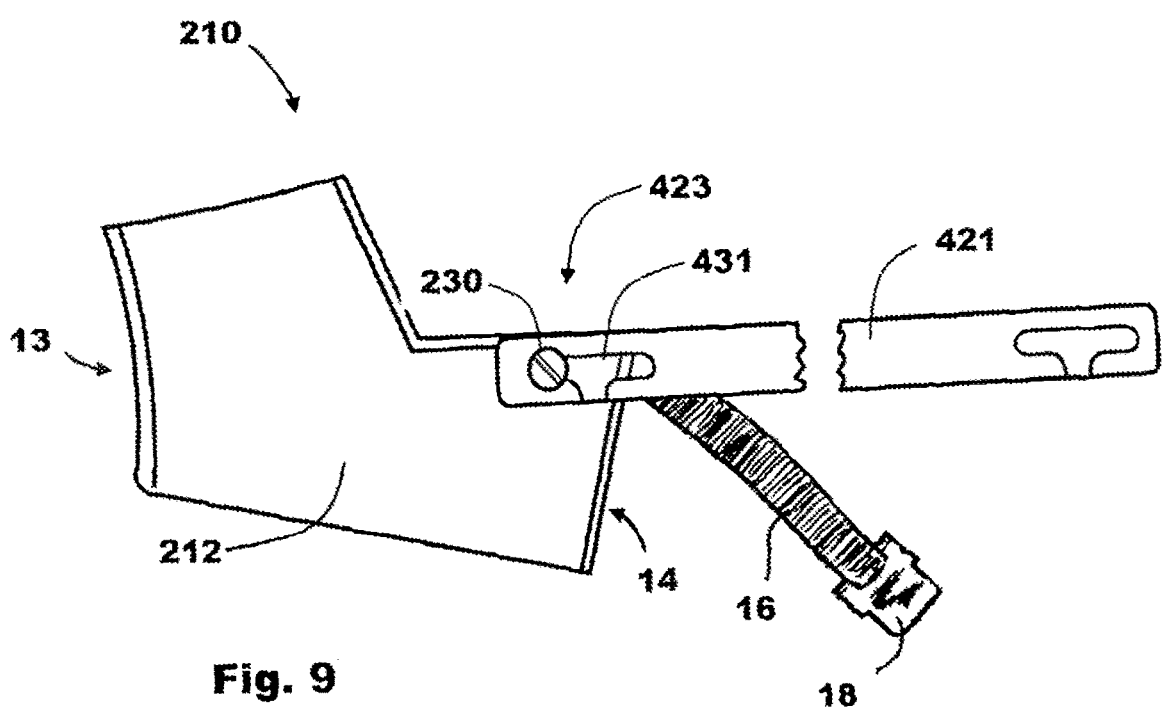
FIG. 9 shows an another embodiment of an animal muzzle with an alternative post and T-shape slotted keyhole fastening means, with the application handles extend from the rear of the muzzle.

FIG. 9 shows another alternative fastening means 423 wherein the post-receiving slot 431 for receiving mounting post 230 has a "T" shape, with top line of the T-shaped slot extending along the axis of the application handle 421, and the leg of the T-shaped slot extending inward from the side edge of the body portion of application handle 421 and intersecting the leg portion.

An alternative fastening means is shown in FIGS. 10 and 11a through 11c, which illustrates post retainer 540 that functions to regulate entry, securement, and exit of mounting post 530 relative to post-receiving slot 531, for securing releasably application handle 521 to muzzle body 512. Post-retainer 540 includes a base 541 at one end secured to application handle 521, and a movable arm 542 cantilevered away from the base 541 and having a retention aperture 543 formed through the arm 542 (FIG. 10 shows the post-retainer 540 spaced apart laterally from the end 539 of application handle 521, rather than secured thereto, in order to illustrate the alignment of the openings and elements of the post retainer 540). Retention aperture 543 has a diameter or size greater than that of post head 534 of mounting post 530. The post head 534 is inserted through the retention aperture 535 in the end 539 of the application handle 521 and pressed laterally against the inside surface of the distal end 549 of the arm 542, to bias the arm 542 laterally away from the end 539 (FIG. 11a). The application handle 521 is then moved forward, so that the throat 533 of mounting post 530 moves rearwardly into and along narrow-width post-retainer portion 536 of post receiving slot 531 (FIG. 11b), until the post head 534 registers with and passes through the retaining aperture 543 in the arm 542 (FIG. 11c), to prevent throat 533 of mounting post 530 from moving out of narrow-width post-retainer portion 536 of post receiving slot 531, thereby "locking" application handle 521 to muzzle body 512. Application handle 521 can be removed from muzzle body 512 by lifting the end 549 of arm 542 until retaining aperture 543 has cleared and no longer confines post head 534 of mounting post 530. The application handle 521 is then moved rearward, so that throat 533 of mounting post 530 slides out of narrow-width post-retainer portion 536 and into the retention aperture 535 of post receiving slot 531, freeing the application handle 521 from the mounting post 530. Reference is made to U.S. Pat. No. 7,604,307, which is incorporated by reference in its entirety, for its description of incorporating said post retainer with a mounting post and post-receiving slot system.

Figure 12A:
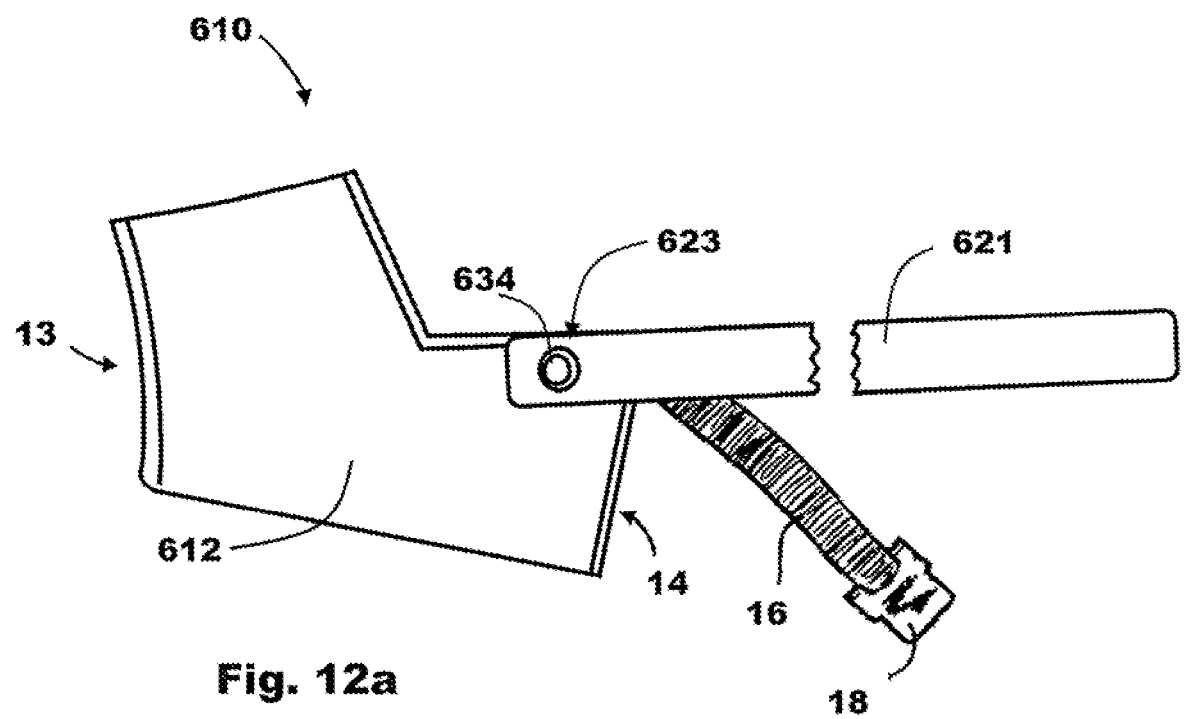
FIGS. 12a and 12b show an alternative embodiment of a muzzle having an application handles fixed integrally to the opposed lateral sides of the muzzle body, FIGS. 13a and 13b each show an animal muzzle according to the present invention, wherein the application handle has a telescoping means for adjusting the length of handle and is shown in its a) retracted and b) extended state.
Figure 12B:
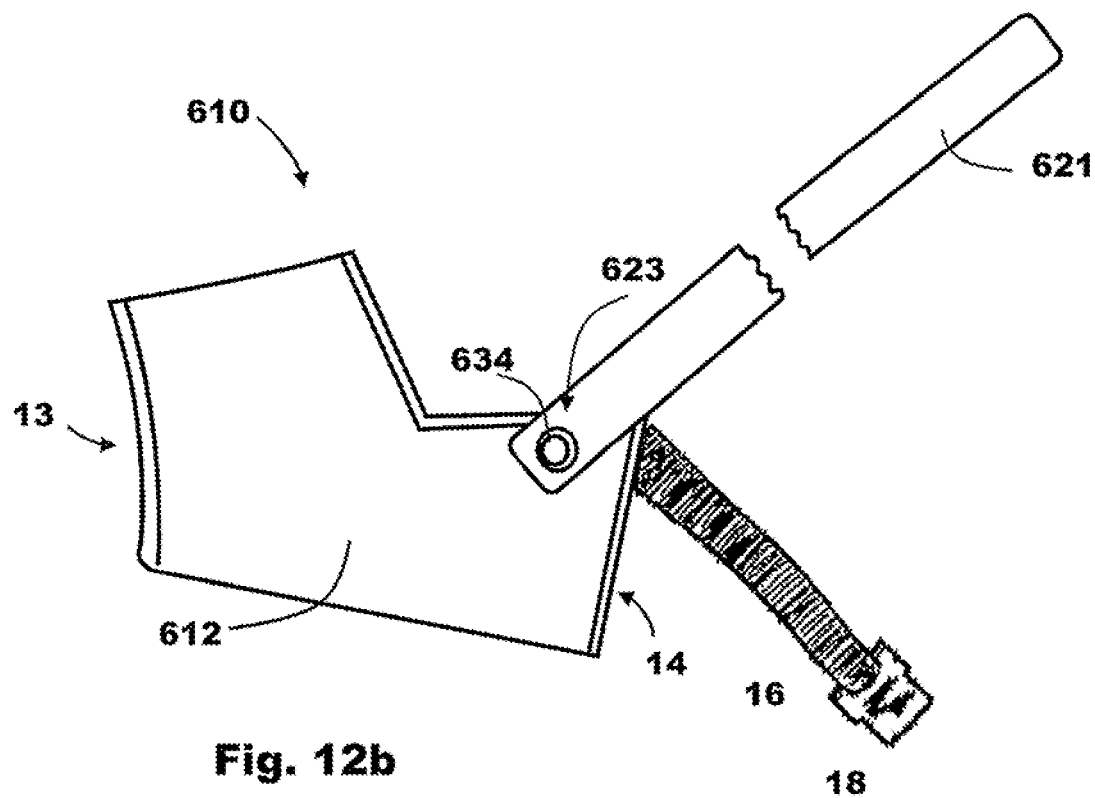

In another aspect of the invention, as shown in FIG. 12a, the application handles can be fixed integrally 623 to the opposed lateral sides of muzzle body 612 of muzzle 610, rather than being releasably fastenable. Integrally fixed application handles 621 may be useful when the animal is being muzzled for a short period of time. The fixture 634 of application handle 621 to muzzle body 612 can be by any well-known fixing means, including but not limited to adhesive, riveting, stapling, stitching, welding, bolting and threading. In an alternative embodiment, the application handle can be pivotably fixed to the muzzle body, as shown in FIG. 12b, allowing the fixed handle to pivot around the point of fixture in one or more planes or axes.

For users such as veterinarians, groomers, trainers, zoo-keepers, or anyone with multiple animals to muzzle, having several fixed-length application handles may create a clutter, be less cost-effective, and create confusion in an emergent situation regarding the length of the application handle that should be chosen. Therefore, in an alternative embodiment of this invention, the length of the application handles is adjustable by the user. There are numerous examples of adjustable-length handles or handle extensions that telescope, fold, or detach completely. Reference is made to U.S. Pat. Nos. 4,659,125, 7,445,231, and 2,614,879, which are incorporated by reference in their entireties, for descriptions of telescoping handles, folding handles, and detachable handle extensions, respectively. Furthermore, the lengths of these adjustable handles can either be defined at specific lengths or be fully adjustable to any length the user desires. Reference is made to U.S. Patent Application Ser. No. 2003/0038007 and U.S. Pat. No. 5,553,350, which are incorporated by reference in their entireties, for descriptions of specifically- and freely adjustable-length handles, respectively.

Figure 13A:
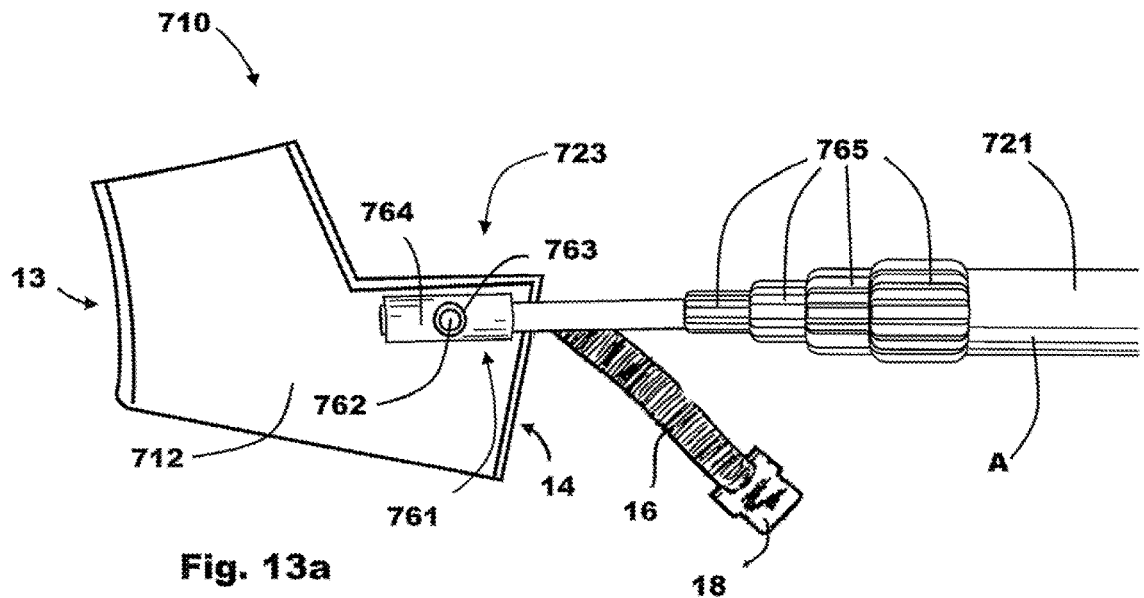
Figure 13B:
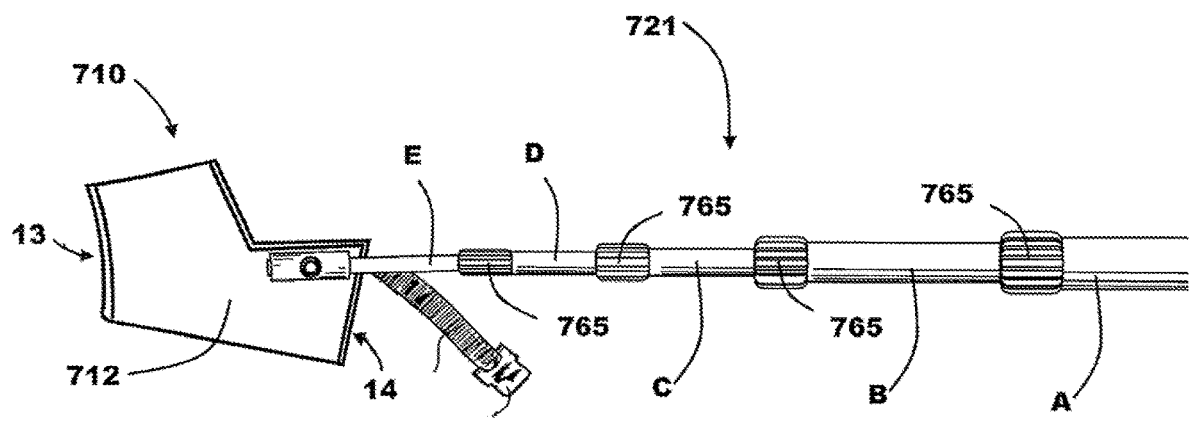

FIGS. 13a and 13b show an embodiment of the present invention having a fully adjustable-length telescoping application handle 721 fastened to muzzle body 712 of muzzle 710. The telescoping application handle include a plurality of telescoping tube sections that can be extended section by section in sequence, to a length to be determined by the user. The telescoping application handle 721 consists of a grasping section A, with which the user controls and operates the application handles 721. Extending from the grasping section A are one or more branching sections B, C, and D, which serve to adjust the length of the application handle 721. Each telescoping section is connected in sequence by section ring 765. Fastening section E fastens to muzzle body 712 at fastening means 723. As illustrated, fastening means 723 can include a ball and detent system 761. The ball and detent system includes a distal portion of the section E having a spring-loaded ball 762 restrained within and extending partly through the outer wall of the tube-shaped Section E. The extending ball 762 extends outwardly into a detent hole 763 in a retaining bracket 764 to secure the Section E within the bracket 764.

While some preferred embodiments of the present invention have been described above, this description should not limit the scope of the present invention as other embodiments may be devised within the spirit and scope of the present invention by one skilled in the art.

I claim:

1. A muzzle configured to be secured onto the head of an animal while keeping a user's hands at a safe distance from the animal's mouth, the muzzle comprising:
    a. a muzzle body configured to be placed on the head of the animal to cover the snout of the animal, the muzzle body comprising:
        a front end adapted to receive the snout of the animal; and
        a rear end adapted to receive the mouth of the animal;
    b. a strap assembly fixedly attached to the muzzle body and configured to secure the muzzle body to the animal's head, the strap assembly comprising:
        one or more head straps, and
        a means for fastening the one or more head straps to each other;
    c. a pair of releasable application handles releasably fastened to opposed lateral sides of the muzzle body, each releasable application handle being rigid or semi-rigid, and comprising a proximal end and a distal end, wherein:
        the proximal end of each releasable application handle is fastened to the muzzle body by a releasable fastening means;
        the proximal end of the releasable application handle is releasable from the muzzle body when the releasable fastening means is unfastened; and
        the distal end of each releasable application handle is a free end that extends away from the muzzle body and the strap assembly.

2. The muzzle according to claim 1, wherein the releasable fastening means for each releasable application handle comprises:
    a. a mounting post fixed to a lateral side of the muzzle body, the mounting post comprising:
        an anchor portion fixedly attached to the muzzle body,
        a post head having a diameter, and
        a throat portion that connects the head portion to the anchor portion and
        having a diameter that is smaller than the post head diameter; and
    b. a post-receiving slot located at the proximal end of the releasable application handle and configured to receive and retain the mounting post, wherein
        the post-receiving slot has an entry/exit portion and at least one post-retainer slot portion having a width that is smaller than the diameter of the post head of the mounting post, and that is larger than the diameter of the throat portion of the mounting post.

3. The muzzle according to claim 2, wherein the distal ends of the releasable application handles are configured to extend rearward from the muzzle body.

4. The muzzle according to claim 2, wherein the semi-rigid or rigid releasable application handles are comprised of a material selected from the group consisting of heavy-weave web material, plastic, leather, metal, wood, or any combination thereof.

5. The muzzle according to claim 2, wherein the releasable application handles have a length of about 8 to 28 inches.

6. The muzzle according to claim 2, wherein the releasable application handle is pivotable around the mounting post while the mounting post is retained within the post-receiving slot.

7. The muzzle according to claim 2, wherein the proximal end of each application handle further comprises a post retainer to regulate entry and exit of the mounting post relative to the post-receiving slot, the post retainer comprising:
    a. a base at one end adapted to be coupled to the application handle, and
    b. a moveable arm at the opposite end that is cantilevered to the base and formed to include a retention aperture, thereby retaining the application handle to the mounting post until it is unfastened.

8. The muzzle according to claim 2, wherein each of the application handles further comprise a means for optionally adjusting the length of the application handle, selected from the group consisting of a telescoping means, folding means, or detachable extension means.

9. The muzzle according to claim 8, wherein each of the application handles comprise a plurality of telescoping tube sections that can be extended section-by-section, in sequence, to a length to be determined by a user.

10. The muzzle according to claim 2, wherein the post-receiving slot comprises two post-retainer slot portions, wherein each post-retainer slot portion extends laterally from opposed sides of the entry/exit portion of the post-receiving slot.

11. The muzzle according to claim 2, wherein the post-retaining slot comprises a T-shaped post-retainer slot portion, wherein the top line of the T-shaped post-retainer slot portion extends along the axis of the releasable application handle, and the leg of the T-shaped post-retainer slot portion extends from the top line to a side edge of the releasable application handle.

12. The muzzle according to claim 2, wherein the post-retainer slot portion is curved.

13. The muzzle according to claim 1, wherein the strap assembly additionally comprises an adjustment means configured to facilitate a secure fit of the strap assembly around the animal's head.

14. The muzzle according to claim 1, wherein the distal end of each releasable application handle comprises a grip element.

15. The muzzle according to claim 1, wherein the distal ends of the releasable application handles are configured to extend rearward from the muzzle body.

16. The muzzle according to claim 1, wherein the semi-rigid or rigid releasable application handles are comprised of a material selected from the group consisting of heavy-weave web material, plastic, leather, metal, wood, or any combination thereof.

17. The muzzle according to claim 1, wherein each of the application handles further comprise a means for optionally adjusting the length of the application handle, selected from the group consisting of a telescoping means, folding means, or detachable extension means.

18. The muzzle according to claim 17, wherein each of the application handles comprise a plurality of telescoping tube sections that can be extended section-by-section, in sequence, to a length to be determined by a user.

19. The muzzle according to claim 1, wherein the releasable application handles have a length of about 8 to 28 inches.

\* \* \* \* \*